United States Patent [19]

Fraden

[11] Patent Number: 4,769,545
[45] Date of Patent: Sep. 6, 1988

[54] MOTION DETECTOR

[75] Inventor: Jacob Fraden, Hamden, Conn.

[73] Assignee: American IRIS Corporation, New Haven, Conn.

[21] Appl. No.: 935,017

[22] Filed: Nov. 26, 1986

[51] Int. Cl.⁴ .............................. G01J 5/08; G01J 5/10
[52] U.S. Cl. ..................................... 250/353; 250/342; 340/567
[58] Field of Search ................. 250/342, 353, 338 PY; 340/567, 600

[56] References Cited

U.S. PATENT DOCUMENTS

| | | | |
|---|---|---|---|
| Re. 29,082 | 12/1976 | Schwarz | 340/258 D |
| 3,760,399 | 9/1973 | Schwarz | 340/258 D |
| 3,809,920 | 5/1974 | Cohen et al. | 307/400 |
| 3,839,640 | 10/1974 | Rossin | 250/353 |
| 3,842,276 | 10/1974 | Southgate | 250/336.1 |
| 3,958,118 | 5/1976 | Schwarz | 250/221 |
| 4,052,616 | 10/1977 | Keller | 250/353 |
| 4,052,716 | 10/1977 | Mortensen | 340/233 |
| 4,225,786 | 9/1980 | Perlman | 250/342 |
| 4,321,594 | 3/1982 | Galvin et al. | 340/567 |
| 4,379,971 | 4/1983 | Smith et al. | 250/342 |
| 4,670,655 | 6/1987 | Zierhut | 250/342 |

OTHER PUBLICATIONS

W. R. Blevin and Jon Geist, "Influence of Black Coatings on Pyroelectric Detectors", *Applied Optics*, vol. 13, No. 5 (May 1974), pp. 1171–1178.

*Primary Examiner*—Janice A. Howell
*Assistant Examiner*—Constantine Hannaher
*Attorney, Agent, or Firm*—John R. Doherty

[57] ABSTRACT

A miniature passive infrared motion detector consists of an optical system, a pyroelectric polymer film and an electronic circuit. The optical system is made of a curved Fresnel lens and an elongated wave guide having a reflective inner surface. The polymer film is also curved with the same radius as the lens and has two interdigitized electrodes on the rear surface and one uniform electrode on the front surface. The front electrode is covered with infrared absorbent material. The electronic circuit contains a differential amplifier and a threshold detector.

22 Claims, 4 Drawing Sheets

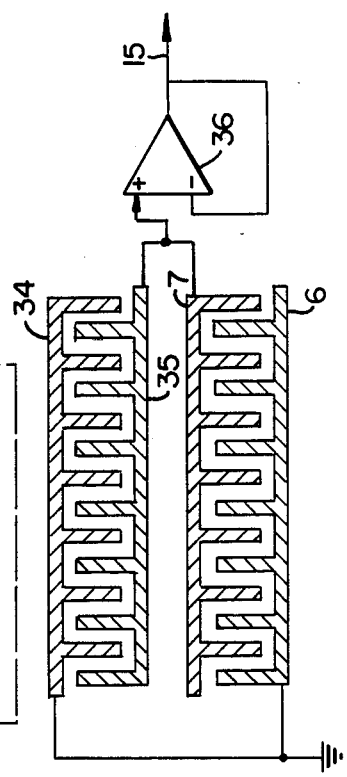
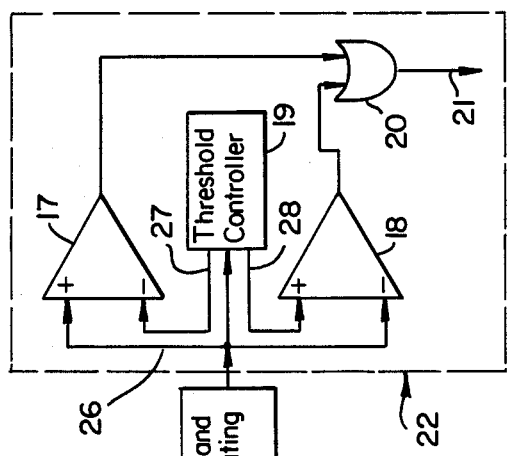
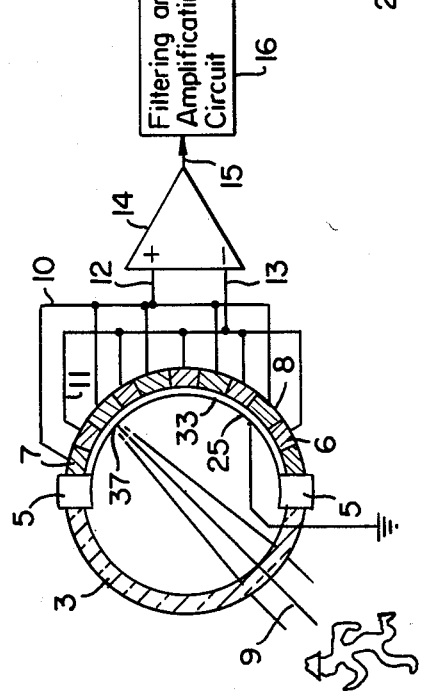
FIG. 2
FIG. 5
FIG. 6

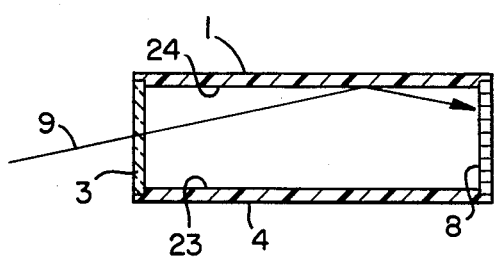
FIG. 8
FIG. 9
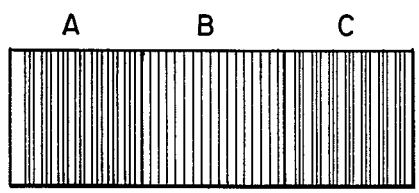
FIG. 10
FIG. 11
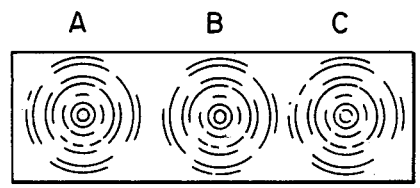

MOTION DETECTOR

BACKGROUND OF THE INVENTION

Any object emits radiation, the spectral characteristics of which depend on the object's temperature. If the temperature of the object is different from that of ambient, radiative energy transfer occurs between the object and its surroundings. This energy transfer can be detected by an appropriate sensor. A warm, moving object (a person or animal) not only radiates electromagnetic energy, but its location with respect to the detector changes. In other words, the object can be differentiated from the surroundings by three factors: temperature, location and speed of moving. Therefore, detection must consist of the following steps: collection of radiation, conversion of the radiation into an electrical signal and signal processing.

Several types of infrared passive motion detectors are known in the prior art. Mortensen (U.S. Pat. No. 4,052,716) discloses a system with a plurality of thermistors which collect radiation by means of a parabolic focusing mirror. It uses capacitive coupling to distinguish between slow and fast moving objects. A similar detector, utilizing a thermopile sensor, is disclosed by Schwartz (U.S. Pat. Nos. 3,760,399 and Re. 29,082). In this invention, two fixed thresholds and an OR gate are used to detect positive and negative going signals from a preamplifier. The location and direction of the moving object in the prior art is determined by the above cited authors and by Keller (U.S. Pat. No. 4,052,616) and Schwartz (U.S. Pat. No. 3,958,118). All these detectors use either thermistors or thermocouples as discrete sensors.

The focusing systems in the prior art are made of lenses, parabolic mirrors and/or various reflectors to concentrate radiation on the individual sensors. Some detectors use multiple Fresnel lenses (facet) which focus radiation on a single pyroelectric or thermopile sensor (RCA Motion Switch C-23, Visonic Ltd. Motion Sensor SR-2000E; Kesser Electronics International, Inc. Infrared Sensor, Model 2006 and others presently commercially available). Instead of a small, solid-state sensor, a pyroelectric detector can be designed with a polymer film, such as polyvinylidene fluoride (PVDF). Cohen (U.S. Pat. No. 3,809,920) discloses a design which contains the polymer film with conductive electrodes on both surfaces. The heat flow from non-moving objects can be separated by a cancelling technique, as was disclosed in the U.S. Pat. No. 3,839,640 or by the use of a differential amplifier (Smith et al. U.S. Pat. No. 4,379,971). Smith's detector utilizes a polymer film with interdigitized (alternating) electrodes on one side and a parabolic mirror as a focusing system. The patent of Southgate (U.S. Pat. No. 3,842,276) discloses the use of an alternative electrode arrangement on the opposite surfaces of the film to produce ambient temperature compensation.

SUMMARY OF THE INVENTION

In the preferred embodiment, the motion detector comprizes a shielding housing containing a pyroelectric polymer film having alternating (interdigitized) electrodes on the rear surface and a uniform electrode on the front surface. The radiation is collected by a Fresnel lens made of a flexible, infrared transparent material (polyethylene, e.g.). The lens is curved to the angle of the desired field of view. The pyroelectric film strip is also formed with the same radius as the lens and positioned at a distance approximately equal to the lens' focal length. In other words, the lens and the film form a cylindrical surface with the lens and the sensing film on opposite sides of the cylinder.

Since the pyroelectric film is located at the focal surface (the focal surface is cylindrical, because the lens is curved), radiation from a distant object will be concentrated in a point. This concentrated energy will heat the film surface and the heat will propagate through the film thickness. This will result in generation of electrical charge due to the film's pyroelectric properties. The top and bottom limits of the cylinder are two plates, the inner surfaces of which are preferably reflective. This widens the vertical field of view.

Pyroelectric film is not responsive to constant temperature but rather to the change of the film temperature between the electrodes. Therefore, a stable thermal image on the film surface causes no output signal. When a warm (or cold) object moves, a thermal spot on the film surface also moves. In the proposed design, the pyroelectric film is located at the focal surface of the lens. The film has two conductive electrodes on both sides: uniform on the front and grid-like on the rear. The thermal point will cross the electrode grid when the object moves across the field of view. This, in turn, will cause an alternate electrical charge at the film electrodes, which then can be amplified and processed by the electronic circuit.

The electronic circuit consists of a preamplifier, an amplifier, a filter and a threshold circuit. The threshold may be either fixed or floating. It also may be either single or double ended, depending on the actual application of the detector.

The proposed method, utilizing curved, extended lenses and detectors, can be applied to motion detection over a very wide field of view, up to a 180° solid angle. In this case, the lens and the film have to be formed into two hemi-spheres facing each other. The sensor's hemi-sphere must have an alternatingly sensitive surface, as in the cylindrical design. The electronic processing circuit is the same as for the cylindrical sensor.

PVDF and other pyroelectrics exibit piezoelectric properties, which cause the sensor to become not only a heat detector, but also a sound and vibration detector. Moreover, relatively fast changes in room temperature (because of the operation of heaters or air-conditioners, e.g.) may lead to false-positive detections. Most of these interferences can be considered as distributed over the surface of the sensor and can be cancelled as common mode noise. Symmetrical interdigitized electrodes and a differential amplifier dramatically improve the signal-to-noise ration, significantly reducing the rate of false-positive detections.

BRIEF DESCRIPTION OF THE DRAWING

FIG. 2 shows a cylindrical detector block-diagram

FIG. 5 shows interdigitized electrodes on both sides of the film

FIG. 6 is an equivalent circuit diagram of FIG. 5

FIG. 8 shows a sectional view of the detector

FIG. 9 shows a circular Fresnel Lens

FIG. 10 shows linear (cylindrical) Fresnel lens with multiple sections

FIG. 11 shows circular multiple sections Fresnel lens

DESCRIPTION OF THE PREFERRED EMBODIMENTS

Figure 1:
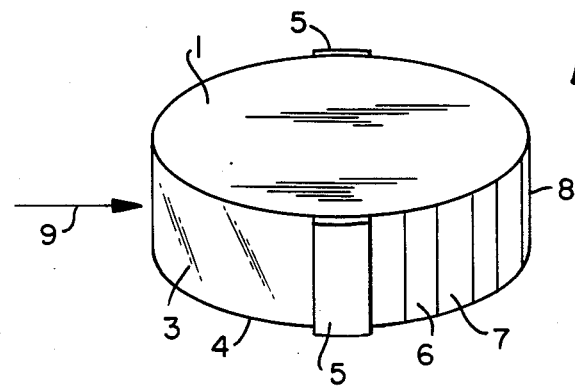
FIG. 1 represents general layout of the preferred embodiment of the motion detector.
Figure 3:
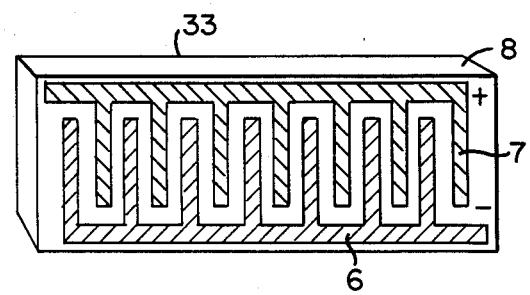
FIG. 3 shows interdigitized rear electrodes
Figure 4:
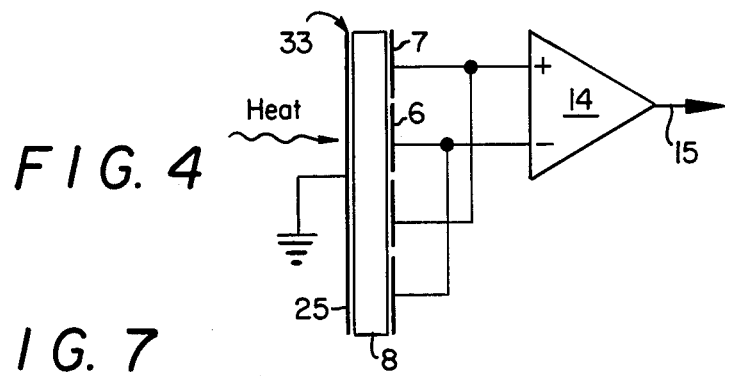
FIG. 4 is an equivalent circuit diagram of FIG. 3

FIG. 1 shows the general arrangement of the preferred embodiment of the motion detector having a cylindrical shape. The focusing lens, 3, and a pyroelectric film, 8, are positioned to shape a cylindrical surface in such a way as for the lens to be at the opposite side from the film. Upper, 1, and lower, 4, plates of the cylinder are made of a non-transparent material. These plates are connected through the side brackets, 5, which separate the lens, 3, from the film, 8. Cylinder diameter is equal to the focal length of the lens, which forms its front side. The film, 8, has interdigitized (alternating) elecrodes, 6 and 7, on its outer (rear) surface. In FIGS. 1-6 film thickness (which normally is in the range of 9-30μ) is exaggerated for better clarity. In FIGS. 1 and 2, electrodes, 6 and 7, are respectively cross hatched in one of two different directions and are isolated from each other. All electrodes cross hatched in the same direction are respectively connected as shown by the networks, 10 and 11, in FIG. 2. The network, 10, is connected to the positive input, 12, of the differential amplifier, 14, while the network, 11, is connected to the negative input, 13. The inner (front) electrode, 33, of the film, 8, is grounded and is coated with a heat absorbing layer, 25. The output 15 of the differential amplifier, 14, is connected to the filtering and amplificating circuit, 16, which, in turn, is connected to the threshold circuit, 22. In the preferred embodiment, the threshold network consists of two voltage comparators, 17 and 18, which outputs are connected to the inputs of OR gate, 20. Threshold controller, 19, generates either constant or floating threshold voltages, 27 and 28. The floating voltages may be controlled by the output signals from the circuit, 16. The threshold circuit, 22, is of a conventional design and its operation is not described here in detail.

Figure 7:
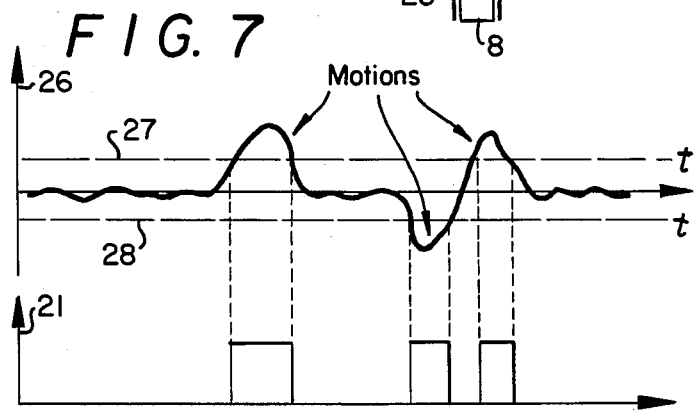
FIG. 7 is a timing diagram

The detector operates as follows. When a warm object (an intruder, e.g.) moves in the field of view (FIG. 2), a small part of its thermal energy, 9, is collected by the lens, 3, and focused into a warm spot, 37, on the surface of the film, 8. Since the film, 8, is totally located on the focal surface of the lens, 3, the energy will be always focused into a small spot, regardless where in the field of view the object is located. When the object moves, the warm spot, 37, also moves along the film, crossing the electrode borders. Since adjacent electrode "fingers" are connected to the opposite inputs of the differential amplifier, 14, the output voltage, 15, changes. These changes are filtererd by the filtering circuit, 16, which, in general, is a band-pass filter, having cut-off frequencies in the range of 0.2-5 Hz. After further amplification by the circuit, 16, the signal, 26, goes to the threshold network, 22, where it is compared with two thresholds: positive, 27, and negative, 28, as it is shown in FIG. 7. Two thresholds permit detection of both polarities of signal, doubling the detector's resolution. Output voltages from the comparators are sqaure pulses which are combined in the OR gate, 20. Its output pulses, 21, (FIG. 7) are the output signals of the motion detector.

Many of the possible interferences can be considered as common mode signals with respect to the pyroelectric film surface. Therefore, the electrode located on the rear side of the film, 8, is divided into two approximately equal areas, 6 and 7 (FIG. 3), which are connected to the inverting and non-inverting inputs of the differential amplifier, 14, as it is shown in the equivalent circuit diagram of FIG. 4. This results in cancellation of common mode interferences, such as acoustic noise, vibration, changes in the ambient temperature, changes in the illuminating conditions, etc. The other side of the film, 8, has a uniform electrode, 33, which shall be grounded.

In the alternative design, both sides of the film, 8, may be covered by interdigitized electrodes as it is shown in FIG. 5 and equivalent circuit of FIG. 6. The front electrode, 34, is connected to the rear electrode, 6, and grounded and the front electrode, 35, is connected to the rear electrode, 7, and to the non-symmetrical amplifier, 36. In this case, common mode rejection is performed by the alternating pairs of electrodes, hence, a simpler unipolar amplifier, 36, can be used.

It follows from the above description, that the cylindrical detector has a very wide angle of view in the horizontal plane, although an angle in a vertical plane is quite narrow. to increase the vertical angle, the inner surfaces, 23 and 24, of the top and bottom plates, 1 and 4, must be made highly reflective (FIG. 8). In this case, radiation beam, 9, coming from a wider angle, will bounce from the mirror-like surface, 24, and reach the film, 8. Obviously, if a wide angle is non desired, the surfaces, 24 and 23, must be not reflective or covered with infra-red absorbing coating (flat black paint, e.g.).

There is a variety of Fresnel lenses which can be used in the cylindrical detector. FIG. 9 shows a circular lens, while FIG. 10 represents a cylindrical Fresnel lens, divided into several sections, A, B and C. This sectioning may be desirable to improve performance of the Fresnel lens which is used in a curved shape. A cicular lens also may be designed with multiple sections, A, B and C as it is shown in FIG. 11.

Figure 12:
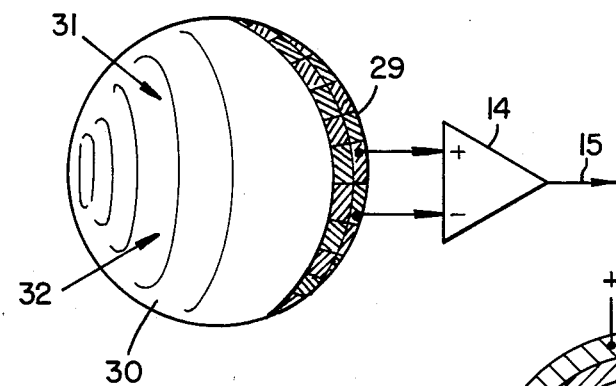
FIG. 12 shows a spherical detector
Figure 13:
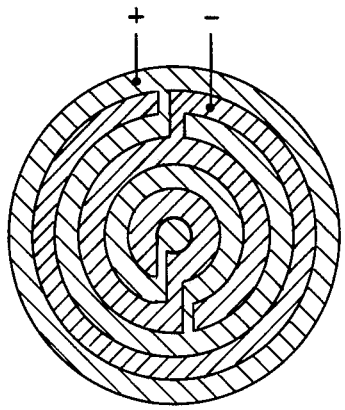
FIG. 13 represents interdigitized rear electrodes for the spherical detector
Figure 14:
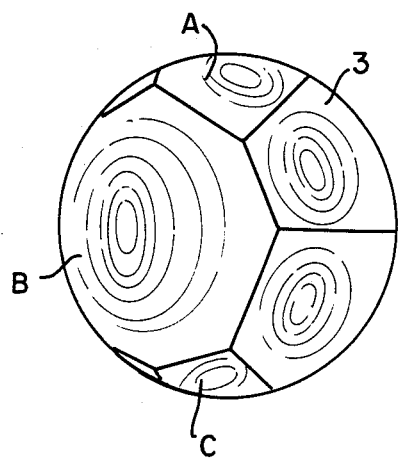
FIG. 14 represents a multiple circular Fresnel lens for spherical detector
Figure 15:
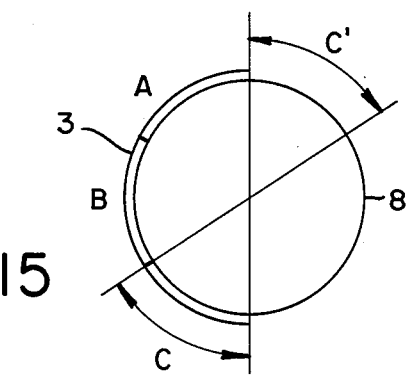
FIG. 15 shows a sectional diagram of cylindrical or spherical detector with multiple lenses.

An alternative way to make a wide angle of view in both vertical and horizontal planes is shown in FIG. 12. Both the lens, 30, and the sensing film, 29, are formed into two hemi-spheres, facing each other and forming a ball-shaped sensor. The functionality of the spherical sensor is generally the same as of the cylindrical sensor as described above. Spherical sensor can accept signals from any direction, 31 or 32, practically within a solid angle of almost 180°. The rear surface of the sensor, 29, must also have alternating electrodes. Many shapes of the electrodes are possible, like checker-board pattern shown in FIG. 12 or circular pattern, shown in FIG. 13. Alternating electrodes are cross hatched in different directions as shown in FIGS. 12 and 13. The hemispherical lenses, as well as cylindrical, can be constructed in a multiple-section fashion, as it is shown in FIG. 14. In the cylindrical or spherical sensors, the multiple sections, A, B and C serve their individual sections of the pyroelectric film. For instance (see FIG. 15), section C of lens, 3, creates images in the section C' of the film, 8. Since each section is curved with a relatively small angle, its spherical aberration will cause little distortion of a warm spot on the film surface. This will result in better resolution and extension of the operating distance of the motion detector.

What I claim is:

1. A passive radiation motion detector which is capable of sensing thermally radiated energy from a moving object, comprising, in combination:
   a housing having an open front end;
   a focusing lens mounted within the front end of said housing, said focusing lens having a curved surface;
   a sheet of pyroelectric material positioned within said housing and having a curved surface with substantially the same radius of curvature as that of said focusing lens, said sheet of pyroelectric material being located behind said lens at a distance approximately equal to the focal length of said lens;
   at least one area of electrically conductive layer on one surface of said pyroelectric material forming at least one first electrode;
   at least one area of electrically conductive layer on the opposite surface of said pyroelectric material forming at least one second electrode; and
   electrical circuit means for amplifing and processing electrical signals produced at said electrodes.

2. A passive radiation motion detector as defined in claim 1, wherein said second electrode is formed of two approximately equal areas of electrically conductive material being connected to a compensating means capable of rejecting common mode signals from said areas of the said second electrode.

3. A passive radiation motion detector as defined in claim 2, wherein said areas of electrically conductive material are divided into smaller interconnected sections and the sections of the respective areas are arranged in alternating fashion on the surface of said pyroelectric material.

4. A passive radiation motion detector as defined in claim 1, wherein a thin layer of thermally absorbing material is affixed to at least a portion of one of said electrodes.

5. A passive radiation motion detector as defined in claim 1, wherein said first electrode is electrically connected to ground to provide electrostatic shielding.

6. A passive radiation motion detector as defined in claim 1, wherein said first electrode is divided into two approximately equal areas of electrically conductive material and one of these areas is electrically connected to said electronic circuit while the other area is electrically connected to ground.

7. A passive radiation motion detector as defined in claim 1, wherein said flexible sheet of pyroelectric material is made of polyvinyledene fluoride.

8. A passive radiation motion detector as defined in claim 1, wherein said focusing lens is a Fresnel lens.

9. A passive radiation motion detector as defined in claim 1, wherein said focusing lens is curved to form a cylindrical surface.

10. A passive radiation motion detector as defined in claim 1, wherein said lens is made of polyethylene.

11. A passive radiation motion detector as defined in claim 1, wherein said lens is divided into sections and each section is made of individual Fresnel lens.

12. A passive radiation motion detector as defined in claim 1, wherein said lens is formed into part of a spherical surface.

13. A passive radiation motion detector as defined in claim 12, wherein said sheet of pyroelectric material is also formed into part of a spherical surface.

14. A passive radiation motion detector as defined in claim 13, wherein said lens and said sheet of pyroelectric material are formed into two hemi-spheres facing each other and forming a ball-shaped configuration.

15. A passive radiation motion detector as defined in claim 14, wherein said second electrode is formed of two approximately equal areas of electrically conductive material, each of said areas being divided into smaller interconnected sections arranged in alternating fashion on the surface of said pyroelectric material.

16. A passive radiation motion detector as defined in claim 15, wherein said second electrode comprises a checker-board pattern.

17. A passive radiation motion detector as defined in claim 15, wherein said second electrode comprises a circular pattern.

18. A passive radiation motion detector as defined in claim 14, wherein said lens is constructed of multiple sections each of which creates its own image on a corresponding section of said hemi-spherical sheet of pyroelectric material.

19. A passive radiation motion detector as defined in claim 1, wherein said housing comprises at least one surface located off the optical axis of said lens.

20. A passive radiation motion detector as defined in claim 19, wherein said surface located off the optical axis of said lens is highly reflective.

21. A passive radiation motion detector which is capable of sensing thermally radiated energy from a moving object, comprising, in combination;
   a housing having an open front end;
   a flexible focusing lens positioned within the front end of said housing;
   a flexible sheet of pyroelectrical material positioned behind said focusing lens, said focusing lens and said sheet of pyroelectric material being arranged so as to form opposite sides of a cylinder having a diameter approximately equal to the focal length of said lens;
   a first electrode comprising an electrically conductive layer covering one surface of said pyroelectric material facing said focusing lens;
   a second electrode comprising two approximately equal areas of electrically conductive material arranged on the opposite side of said pyroelectric material; and
   electrical circuit means for amplifying and processing electrical signals produced at said electrodes.

22. A passive radiation motion detector as defined in claim 21, wherein at least one wall member is positioned at an end of said cylinder, said wall member having a reflective surface.

* * * * *